April 1, 1930.     I. COWLES     1,752,975
FORCE FEED LUBRICATING DEVICE
Filed Sept. 22, 1927
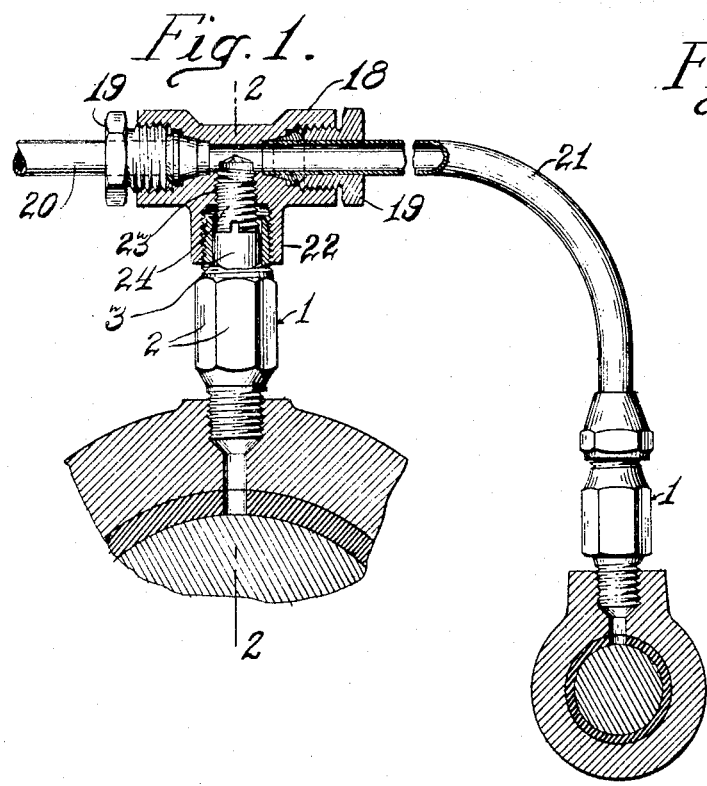
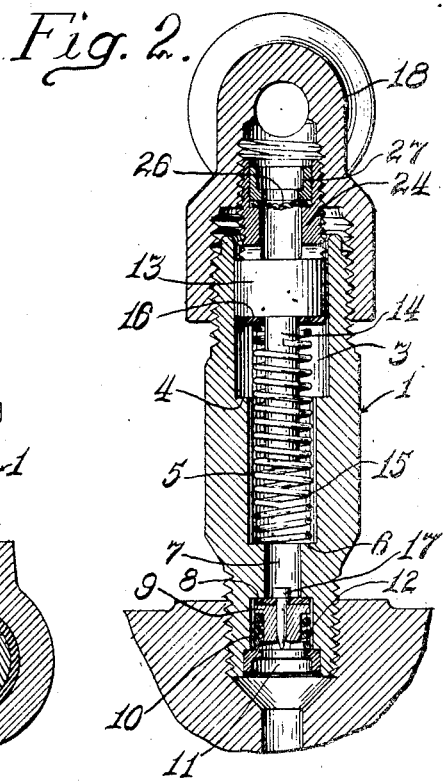
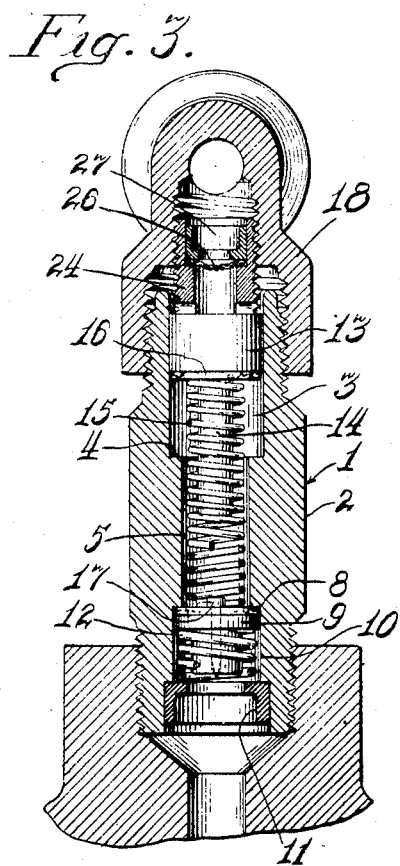
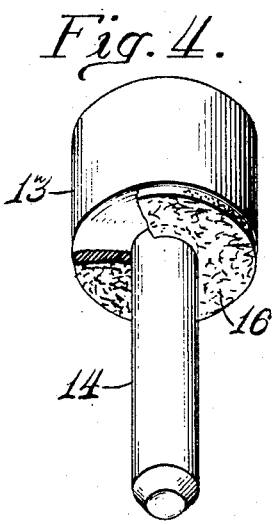
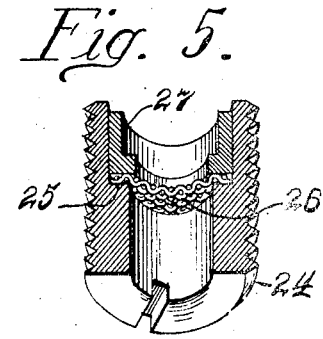
Inventor
Irving Cowles Patented Apr. 1, 1930

1,752,975

UNITED STATES PATENT OFFICE

IRVING COWLES, OF CHICAGO, ILLINOIS, ASSIGNOR TO UNION BANK OF CHICAGO, TRUSTEE, OF CHICAGO, ILLINOIS, A CORPORATION OF ILLINOIS

FORCE-FEED LUBRICATING DEVICE

Application filed September 22, 1927. Serial No. 221,198.

This invention relates to force-feed lubrication of bearings by means of a source of intermittent high and low pressures associated with metering devices mounted on the bearings for delivering a substantially accurately measured volume of lubricant to each of several bearings at each high pressure interval and thereupon shutting off flow to said bearings.

The present invention relates particularly to a specific improvement in the metering devices at the bearings and has for its object to provide devices of this character equipped with means for permitting easy adjustment thereof for varying the volume of lubricant delivered therefrom at each operation thereof in response to high pressure in the oil line in which the device is interposed.

In machines or mechanisms provided with bearings requiring lubrication, there are usually bearings of many different diameters and lengths while the shafts or other rotatable elements journalled therein rotate at different speeds respectively and under widely varying loads. These several bearings require volumes of lubricant, respectively, differing quite as widely as the dimensions of and other conditions pertaining to the same so that while, theoretically, it appears possible to determine the volume of lubricant per time unit required for each thereof, practice has demonstrated that this is not so because of variations in play or tolerance in the various bearings and consequent leakages.

In equipping a machine or mechanism with a force-feed lubricating system, the proportionate requirements of each of the several bearings may be estimated and each bearing equipped with a metering device capable of supplying its maximum requirements. Feeding to each bearing the maximum requirement thereof will, in most instances, result in waste and in inadequate supply, respectively, depending upon unknown conditions existing in the several bearings.

Hence, in applying a force-feed lubricating system to a machine or mechanism, the engineer or mechanic must be governed by the area of bearing surface and speed of rotation as a basis for determining the probable maximum requirements of the respective bearings per time unit. Economic manufacture of metering devices requires that the number of sizes of the latter be limited and, consequently, an ideal degree of accuracy in oil distribution is quite as impossible as it is unnecessary. To permit a reasonably close approach to the ideal accuracy without defeating cost economy in manufacture requires, therefore, a certain range of adjustment of the individual metering devices and the particular object of the present invention is to provide very simple and efficient adjusting means whereby each of a series of metering devices may be adjusted so that the minimum volume delivered by a larger size may be substantially equal to the maximum volume capable of being delivered by the next smaller size while, vice versa, the maximum volume capable of being delivered is substantially equal to the minimum of the next larger size.

The preferred embodiments of the invention are illustrated in the accompanying drawings, wherein:

Figure 1 is a sectional view, partly in elevation, of bearings equipped with metering devices and fittings for associating the same with a source of lubricant, constructed in accordance with the invention.

Figure 2 is a sectional view on the line 2—2 of Figure 1 on an enlarged scale.

Figure 3 is a sectional view similar to Figure 2 showing another or modified embodiment of the invention.

Figure 4 is a perspective view of the piston or plunger element of the metering devices of Figs. 1, 2 and 3.

Figure 5 is a sectional perspective view of the adjusting sleeve employed.

The subject-matter of the present invention, which relates to the metering devices and fittings, per se, is intended and adapted for use in connection with a pump or similar source of lubricant under alternate high and low pressure, examples of pumps adapted for the purpose being disclosed in my copending applications, Serial Nos. 98,886, 131,843 and 187,741, filed, respectively March 31, 1926; August 27, 1926 and April 30, 1927, the last-mentioned application also showing but not claiming metering devices of the same type as are illustrated in the instant case but devoid of adjusting means.

Each of the metering devices, per se, comprises a casing 1, preferably provided with a hexagonal exterior surface 2 between its ends and which is internally longitudinally bored to provide an axial cylindrical chamber 3 extending from one end of the casing 1 to a point between its ends where it terminates in an annular shoulder or valve seat 4 and connects with a smaller bore 5. The latter, as shown in Figure 2, terminates at its other end in an annular shoulder 6 and connects with still smaller diameter discharge bore 7. Bordering the outer end of the bore 7 is a valve seat 8 on which the spring-held check-valve 9 seats, the latter being disposed in the bore 10 at the discharge end of the casing 1.

Forced into and frictionally held in place in the bore 10 is an annularly flanged washer 11 upon which the compression spring 12 which holds the valve 9 normally seated, is supported.

Reciprocable within the chamber 3 is the piston element 13 the stem 14 of which projects into the bore 5, said piston element being of sufficiently smaller diameter than the chamber 3 to permit somewhat resisted and restricted flow of lubricant past said piston.

A relatively long helical compression spring 15 supported upon the shoulder 6 and bearing upon piston element 13, serves to hold the latter normally disposed at the mouth or intake end of chamber 3. A washer 16 of a suitable flexible material covers the annular shoulder of the piston element against which the spring 15 bears, said spring serving to hold said washer in place.

The seat surface of the check valve 9 is also covered with a similar flexible washer which is held in place by means of the pin 17 driven into a central opening in said valve.

In the structure of Fig. 3 the bore 5 terminates at the inverted shoulder or valve-seat 8 for the check-valve 9, the shoulder 6 and bore 7 being omitted. In this structure the spring 15 is supported upon the check-valve 9, the proportionate strength of springs 12 and 15 being such that when the latter is under its maximum compression as determined by the seating of the washer 16 on the seat 4, the check-valve 9 will be maintained on its seat and will be unseated only in response to fluid pressure within the casing sufficient to overcome the balance of resistance offered by the spring 12.

The operation of both types of metering devices above described is identical, the introduction of oil under pressure to the casing 1 causing the piston element 13 to move toward its seat, the by-pass space around said piston causing fluid below the same to be almost instantly under the same pressure as the inflowing fluid, the pressure of the latter being far in excess of what is necessary to overcome the resistance of the spring 12. Thus the incoming fluid, in the absence of resistance to discharge beyond the check-valve 9 by the presence of fluid trapped between the check-valve and the bearing surface by reason of a very tight or "frozen" bearing, will force the piston element to the seat 4 and shut off further flow. At substantially this moment, the check-valve 9 also seats and thus traps fluid between it and the seat 4 so that upon relief of pressure at the intake end of the casing 1, the piston element will be restored to its normal position by the spring 15 and, by reason of the fact that the last-mentioned trapped fluid cannot escape, the fluid in the chamber 3 will transfer around the piston 13 to be disposed between the latter and the check-valve 9. Here it will remain until a further forced flow into chamber 3 takes place whereupon a part of this trapped fluid will be discharged and replaced by a fresh supply as described.

Where the bearing to be supplied is in a normal condition, that is to say, free running, the charge of lubricant fed thereto at each operation of the metering device will be of the same volume, the discrepancy, if any, between successive charges, being inappreciable from a practical commercial point of view but if the bearing be so tight or if it be frozen, then the resistance to flow of lubricant into the same may be resisted to a degree such as will create back-pressure below the check-valve 9 sufficient to slow up flow past the latter, then the movement of the piston 13 will be either retarded or arrested and a continuous slow flow of lubricant into the bearing will continue so long as the pressure on the incoming lubricant is maintained by the pump or the like employed to effect forced flow. But upon relief of said pressure the result will be identical with that occurring at a normal bearing.

The casings 1 and chambers 3 may be varied either in length or diameter or both to thereby vary the volume of lubricant discharged at each pressure operation. Thus very small bearings may be supplied each with only a very minute volume of oil while larger bearings may be fed with one or more cubic centimeters of lubricant simultaneously, and from the same source, the tight or "frozen" bearings only being supplied with a non-measured volume of lubricant.

In order that the measured volume of lubricant fed by each device independently of all others may be varied without substituting a larger or smaller device therefor, I provide a very simple and efficient adjusting means which, preferably, is incorporated in the pipe fitting by means of which the casing 1 is connected with the piping leading from the pump or other source to the several bearings to be lubricated. These fittings consist of the usual line known as couplings, T's, elbows, etc., and differ from the ordinary pipe fittings only in that those shown are equipped with compression pipe couplings for connecting the same with copper tubing.

Thus, as shown in Fig. 1, the T-coupling 18 is provided at the ends of two of its arms with compression pipe couplings 19 by means of which it is detachably connected with tubing 20 leading from the pump or the like to said fitting 19 and with the tubing 21 leading to another fitting or fittings. The third arm of said fitting 18 is provided with a stepped bore, the outer portion 22 of which is of larger diameter than the inner portion 23 and being threaded to fit the outer or intake threaded end portion of the casing 1, this thread being a tapered or pipe-thread. The thread of the inner portion 23 of said bore is cylindrical and receives the threaded sleeve 24 which is of smaller external diameter than the diameter of the chamber 3 of casing 1 so that it may project into the same. The outer or visible end of said sleeve 24 is slotted to receive a screw-driver and is preferably fitted snugly to the threads of bore 23 so that it will retain any position to which it is adjusted. The bore of said sleeve 24 is also stepped to provide a shoulder 25 between its ends on which a strainer 26 of small mesh is supported, the same being held in place by the annularly flanged washer 27 driven into the larger diameter portion of said bore.

This construction is very advantageous in that the pipe fitting can be finished on an ordinary chucking machine at no greater cost than the conventional type and the sleeves are cheaply produced by ordinary automatic screw machines and are easily and cheaply assembled.

In practice the spring 12 for the check-valve 9 is of such strength as to practically equal a counter pressure of twenty-five lbs. per sq. in. while the spring 15 affords a maximum resistance equaling a pressure of about fifteen lbs. per sq. in. on the piston. The lubricant is preferably introduced at a pressure not less than one hundred and preferably approximating from two to four hundred pounds per square inch. These working pressures have been found to be very desirable though the system will operate efficiently under a pressure of fifty pounds per square inch as an approximate minimum under the aforesaid spring resistance conditions. These conditions may, of course, be varied.

The casings 1 are designed for low cost of production by automatic screw machines so that the total cost of installation of the system per bearing is very small.

The tolerance or free annular space around the piston is ordinarily about .004 inch and practice has demonstrated that this permits the use of either light or heavy oil without appreciable difference in the accuracy of the volume discharged at each operation. This is very advantageous in the case of automotive vehicles and machinery which is operated in the open in cold weather as it permits changing from heavy to light oil and vice versa and insures substantially the same degree of efficiency in the lubrication of warm and cold bearings so long as the oil used is not congealed to a substantially non-fluent state.

I claim as my invention:

1. A lubricant measuring device of the type defined comprising a casing equipped with a reciprocable spring-held fluid pressure responsive valve element adapted to shut off flow through said casing following discharge of a substantially measured volume of lubricant therefrom, a pipe fitting connecting said casing with lubricant supply piping and a threaded sleeve in said fitting adjustable axially of said casing and affording a stop against which said valve element is normally held by said spring, said adjustable member determining the operative stroke of said valve-element.

2. A lubricant measuring device of the type described including a casing having a cylindrical chamber open at one end and equipped at its other end with a valve-seat, a spring-held reciprocable valve element in said chamber normally disposed at the open end thereof, a pipe fitting constituting a cap for said open end and connecting said casing with lubricant supply piping, and a threaded sleeve in said fitting constituting an adjustable stop for said valve element for determining its operative stroke.

3. A lubricant measuring device of the type specified comprising a casing having a cylindrical chamber open at one end and terminating at its other end in a valve-seat, a discharge port at the other end of said casing, a check-valve controlling the same a spring for maintaining said check-valve normally seated, an annularly flanged washer driven into the discharge end of said casing and supporting said spring, a reciprocable piston valve disposed in said chamber, a passage connecting the latter with said discharge port, a spring in said passage engaged with said piston valve for normally maintaining the latter off the first-named valve seat, said last-named spring being appreciably weaker than the check-valve spring and overcome by the latter, and a pipe fitting connecting the casing at the open end of said chamber with lubricant supply piping.

4. A lubricant measuring device of the type specified comprising a casing having a cylindrical chamber open at one end and terminating at its other end in a valve-seat, a discharge port at the other end of said casing, a check-valve controlling the same, a spring for maintaining said check-valve normally seated, an annularly flange washer driven into the discharge end of said casing and supporting said spring a reciprocable piston valve disposed in said chamber, a passage connecting the latter with said discharge port, a spring in said passage engaged with said piston valve for normally maintaining the latter off the first-named valve seat, said last-named spring being appreciably weaker than the check-valve spring and overcome by the latter, and supported upon said check-valve.

5. A lubricant measuring device of the type specified comprising a casing having a cylindrical chamber open at one end and terminating at its other end in a valve-seat, a discharge port at the other end of said casing, a spring-held check-valve normally sealing said port, a passage connecting the latter with said discharge port, a spring in said passage engaged with said piston valve for normally maintaining the latter off the first-named valve-seat, said last-named spring being appreciably weaker than the check-valve spring and overcome by the latter and supported upon said check-valve.

IRVING COWLES.